United States Patent [19]

Miller

[11] Patent Number: 5,595,461
[45] Date of Patent: Jan. 21, 1997

[54] APPARATUS FOR CONTROLLED VACUUMING OF HIGH DENSITY ABRASIVE BLAST MEDIA

[75] Inventor: David B. Miller, Advance, N.C.

[73] Assignee: Ingersoll-Rand Company, Woodcliff Lake, N.J.

[21] Appl. No.: 607,620

[22] Filed: Feb. 27, 1996

Related U.S. Application Data

[63] Continuation-in-part of Ser. No. 292,988, Aug. 19, 1994, abandoned.

[51] Int. Cl.$^6$ ................................................. B65G 53/42
[52] U.S. Cl. ............................................................ 406/152
[58] Field of Search ..................................... 406/113, 115, 406/116, 141, 142, 143, 151, 152, 153

[56] References Cited

U.S. PATENT DOCUMENTS

| | | | |
|---|---|---|---|
| 2,302,366 | 11/1942 | Bucknell | 239/460 |
| 3,018,135 | 1/1962 | Reib | 406/116 |
| 3,031,233 | 4/1962 | Pendleton | 406/151 |
| 3,262,318 | 7/1966 | Decker | 73/864.33 |
| 3,416,844 | 12/1968 | Steidley | 406/152 |
| 4,215,956 | 8/1980 | Reba | 406/152 |
| 4,265,572 | 5/1981 | Bourdois et al. | 406/114 |
| 4,265,573 | 5/1981 | Reba | 406/152 |
| 4,409,746 | 10/1983 | Beck | 37/317 |
| 4,808,043 | 2/1989 | Le Marrec et al. | 406/181 |
| 4,829,724 | 5/1989 | Miller, Jr. et al. | 451/99 |
| 5,037,246 | 8/1991 | Okano et al. | 406/152 |

FOREIGN PATENT DOCUMENTS

| | | | |
|---|---|---|---|
| 273044 | 11/1989 | Germany | 406/152 |

OTHER PUBLICATIONS

*Fan Engineering Handbook*, Publsihed By Buffalo Forge Co., Buffalo NY Eight Edition, 1983, pp. 24–27, 24–28.

*Primary Examiner*—Andrew C. Pike
*Attorney, Agent, or Firm*—Michael M. Gnibus

[57] ABSTRACT

A density controller provides for a continuous proportionate mixing of particles with a conveying airstream of a vacuum generator, which includes a hose having an intake nozzle end and an exhaust end. The density controller includes a substantially cylindrical main body having a first open end, which telescopically receives the intake nozzle end, and a second substantially closed end. An air inlet is formed between an outer surface of the intake nozzle end and an inner surface of the density controller main body. At least one opening is formed in the second substantially closed end of the density controller main body. The at least one opening has a total area ranging from 10% to 20% of the cross-sectional area of the intake nozzle end. At least one clearance member is located adjacent the closed second controller end and separates the nozzle and second controller ends by a fixed distance.

16 Claims, 4 Drawing Sheets

APPARATUS FOR CONTROLLED VACUUMING OF HIGH DENSITY ABRASIVE BLAST MEDIA

This application is a continuation-in-part of application Ser. No. 08/292,988, filed Aug. 19, 1994, now abandoned.

BACKGROUND OF THE INVENTION

This invention generally relates to abrasive blasting systems, and more particularly to a vacuum entrance device or density controller for vacuuming high density abrasive blast media, such as steel grit.

Steel grit has been used in abrasive blasting operations, such as for removing paint and debris from buildings, bridges, or other structures. Steel grit is superior to sand in use during such abrasive blasting operations because sand typically becomes pulverized during low velocity abrasive blasting operations. Steel grit, however, does not become pulverized, even during high velocity abrasive blasting operations. Therefore, steel grit may be used for sustained high velocity abrasive blasting procedures thereby permitting significant reductions in the time required for an abrasive blasting process. However, despite its laudable characteristics, steel grit is significantly more dense than sand. Typically, steel grit weighs 260 lbs./cubic ft., however; sand weighs less than 100 lbs./cubic ft.

Vacuum generators have been used to convey collected solid particles and abrasive media during an abrasive blasting operation. Vacuum entrance devices (also called density controllers) have been designed for use with such vacuum generators for mixing the solid particles and abrasive media within a conveying airstream. Although these density controllers have operated with varying degrees of success with low density abrasive media, such as sand for example, conventional density controllers are unable to effectively accommodate high density abrasive media, such as steel grit.

When used with steel grit, conventional density controllers create large fluctuations in system air conveying velocities, create large fluctuations in system vacuum pressure, require extensive complex adjustments, and cause continuous choking of the steel grit and solid particles within the vacuum generation system. Choking occurs when an excessive volume of high density steel grit is permitted to enter a conveying pipe of the vacuum system. When choking occurs, the steel grit falls out of the vacuum airstream and clogs the conveying pipe.

Another problem associated with the use of steel grit in abrasive blasting systems relates to the high conveying velocity required to effectively move the steel grit through the blasting system without clogging the system. FIG. 4 is a graph showing the associated required conveying velocities for different size and weight materials. As shown on the graph, generally, the lighter the material the lower the required conveying velocity, and the heavier the material the greater the required conveying velocity. For example, the conveying velocity of average size steel grit weighing 260 lbs./cubic ft. ranges from 10,000 ft./min. to 11,000 ft./min. depending on particle size. In order to convey the particles with the required velocity and thus not clog the system, it is necessary to provide and maintain sufficient system vacuum and airflow. If sufficient vacuum and airflow are not maintained, the grit will not be drawn into the system and conveyed through the system with the required velocity and the system will become clogged.

It is easier to provide and maintain sufficient airflow for conveying material lighter than steel grit than it is to convey heavy steel grit since the required conveying velocities for lighter materials are significantly lower than the conveying velocity for steel grit. Thus, the system vacuum and airflow required to draw and convey a lighter material are easier to produce and maintain than the vacuum and airflow required to draw and convey steel grit.

As a matter of comparison, as indicated in Fan Engineering, eighth edition, published by Buffalo Forge Company, the conveying velocity of corn is 5600 ft./min., of oats is 4500 ft./min., of sand is 7000 ft./min. and of wheat is 5800 ft./min. These light materials are easier to convey and may be conveyed in varying volumes by adjusting the size and shape of the material inlet ports.

In order to ensure the required system vacuum and airflow for conveying steel grit are supplied, it is necessary to maintain the end of the nozzle a fixed distance from the end of the density controller. If the nozzle end is too close to the controller end, too much steel grit will be drawn into the system and the system will clog. If the nozzle end is too far from the controller end, the nozzle will not provide sufficient airflow to keep the grit suspended in the system and the system will become clogged. Typical systems use fasteners such as screws, bolts, or the like to maintain a fixed distance between the end of the density density controller and the nozzle end. However, over time as the nozzle/controller combination is repeatedly inserted into the dense, heavy steel grit, the fasteners may be knocked loose and, as a result, the density controller will become displaced relative to the nozzle, thereby negatively affecting the operation of the abrasive blasting system.

Also, machine operators may loosen the fasteners and manually reposition the density controller relative to the nozzle, thereby negatively affect the efficiency and operation of the blasting system.

The foregoing illustrates limitations known to exist in present density controllers. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a density controller for use with a vacuum generator for vacuuming particles, such as steel grit or other high density abrasive blast materials, for example. The density controller provides for a continuous proportionate mixing of particles with a conveying airstream. The vacuum generator includes a hose having an intake nozzle end and an exhaust end. The density controller is defined by a substantially cylindrical main body which includes a first open end, which telescopically receives the intake nozzle end, and a second substantially closed end. An air inlet is formed between an outer surface of the intake nozzle end and an inner surface of the substantially cylindrical main body. At least one opening is formed in the second substantially closed end of the substantially cylindrical main body. The at least one opening has a total area ranging from 10% to 20% of the cross-sectional area of the intake nozzle end. An apparatus is provided for fixedly locating the substantially cylindrical main body in a predetermined location about the intake nozzle end during operation of the density controller.

The main body of the controller includes at least one clearance member which separates the nozzle and controller ends by a desired distance.

BRIEF DESCRIPTION OF THE DRAWING FIGURES

DETAILED DESCRIPTION

Figure 1:
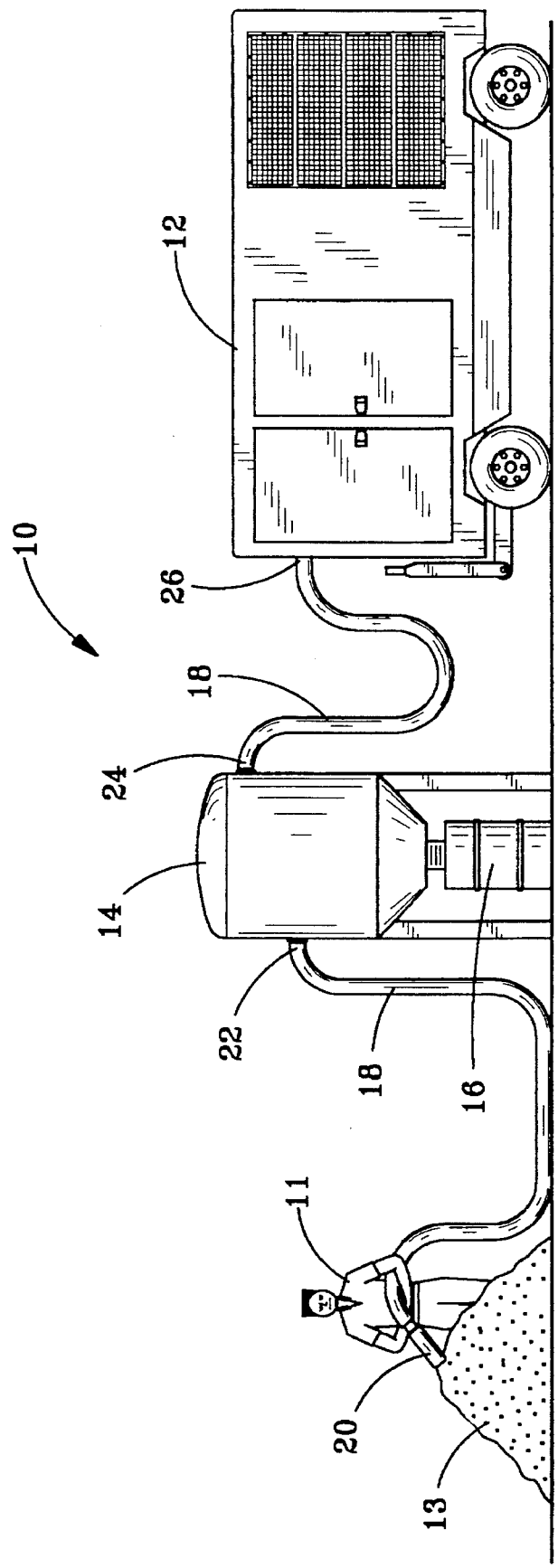
FIG. 1 is an environmental view of a vacuum generator for vacuuming particles, such as steel grit, for example.

Referring now to the drawings, wherein similar reference characters designate corresponding parts throughout the several views, FIG. 1 illustrates generally at 10 a pneumatic conveyor or vacuum generation system for vacuuming particles ranging from low density particles, such as grain or sand, to high density particles, such as steel grit for abrasive blasting operations. An end user 11 may employ the pneumatic conveyor 10 to reclaim a volume of expended solid particles and abrasive media 13 during an abrasive blasting operation. Included in the pneumatic conveyor 10 is a vacuum generator 12, a filtration and separation unit 14, a hopper 16, and a vacuum hose 18.

The vacuum generator 12 may be any type commercially available vacuum generator which is capable of providing a conveying airstream through a transport distance of from 20 feet to 300 feet. The vacuum hose 18 has a first portion which includes a first intake nozzle end 20 and a second exhaust end 22 which communicates with the filtration and separation unit 14. A second portion of the vacuum hose 18 includes a first end 24 which communicates with the filtration and separation unit 14 and a second end 26 which communicates with the vacuum generator 12. The filtration and separation unit is conventional in design comprising at least one air filter and a separator (both not shown) for separating solid particles and abrasive blast media from the conveying airstream. The separator may be a cyclone type separator.

During operation of the pneumatic conveyor 10, the volume of solid particles and abrasive blast media 13 is conveyed by action of the vacuum generator 12 through the first intake nozzle end 20, through the first portion of the vacuum hose 18, through the second exhaust end 22, and is deposited into the filtration and separation unit 14 wherein the suspended solids are filtered and separated from the conveying airstream by methods which are well known in the art. Thereafter, the solids are deposited from the filtration and separation unit 14 into the hopper 16. The filtered air is returned to the vacuum generator 12 through vacuum hose 18.

Figure 2:
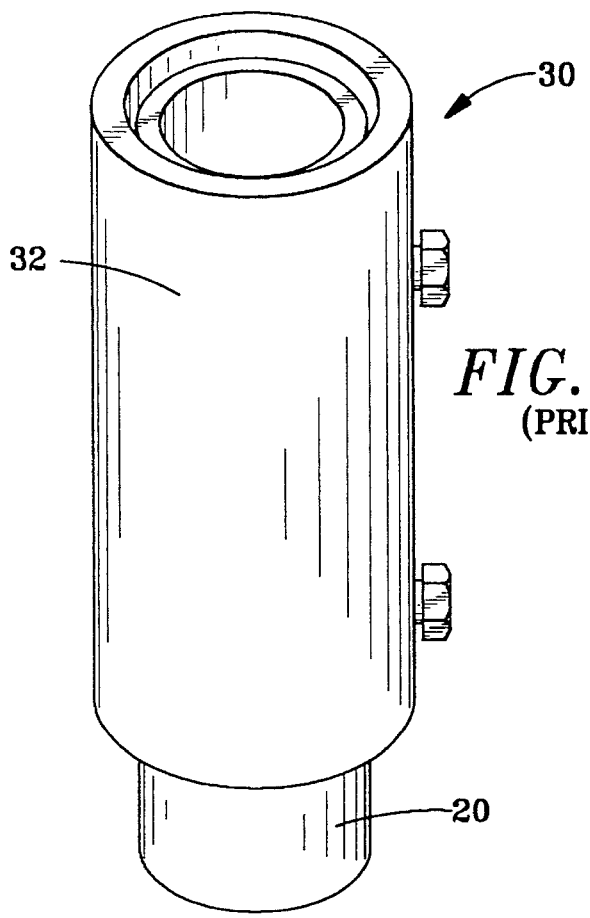
FIG. 2 is a perspective view of a prior art density controller.

A conventional vacuum entrance device or density controller is generally illustrated at 30 in FIG. 2. The conventional density controller 30 comprises a pair of concentric tubes. One concentric tube may be the first intake nozzle end 20 of the vacuum hose 18. A second concentric tube 32 is essentially a cylindrical sleeve which is adjustably axially with respect to the first intake nozzle end 20. A pair of threaded fasteners may be provided to fixedly locate the second sleeve 32 in a predetermined position about the first intake nozzle end 20. An air inlet (not shown) is formed between an inner surface of the second concentric tube 32 and an outer surface of the first intake nozzle end 20. Typically, a prior art density controller 30 has included an air inlet having an area of about 5.15 square inches. Also, such density controllers 30 have included a single media inlet, through which solid particles pass, having an area of about 12.57 square inches.

It has been discovered that the conventional density controller 30 may choke the conveying airstream when the device 30 is directly inserted into the volume of solid particles and abrasive blast media 13. In such instances where the abrasive blast media is of a high density type, such as when steel grit is to be vacuumed, choking is certain to occur. Such choking is caused by a major jump in pressure drop (required system increase) from 3.8 inches of water to 120.7 inches of water. (This represents a 3176% increase in pressure drop.) Entire system pressure drops have been recorded as low as 100 inches of water during the conveyance of steel grit at a rate of eight tons per hour.

Figure 3:
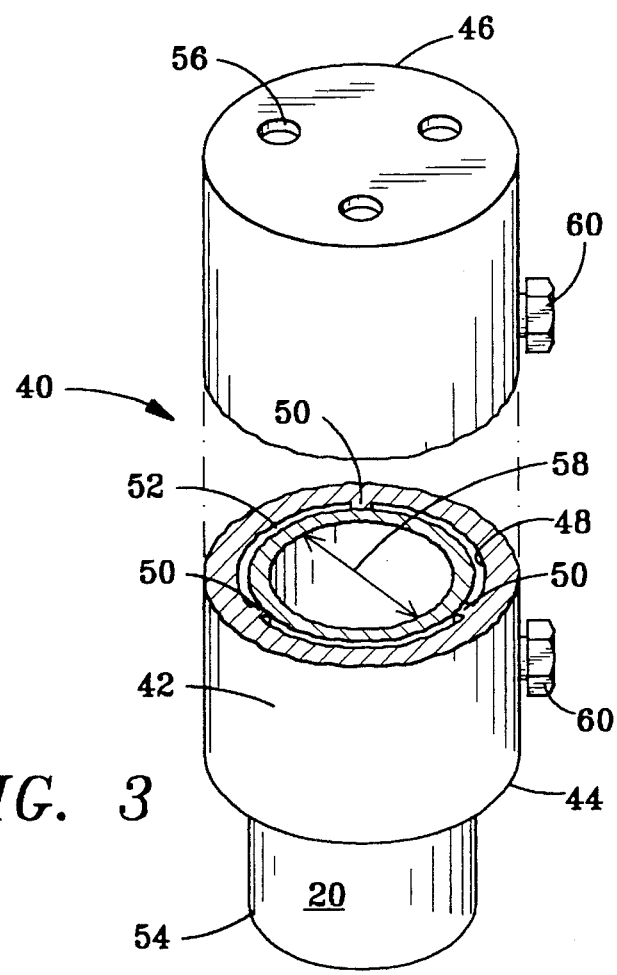
FIG. 3 is a perspective view of a density controller of the present invention showing an internal portion of the density controller in section.
Figure 4:
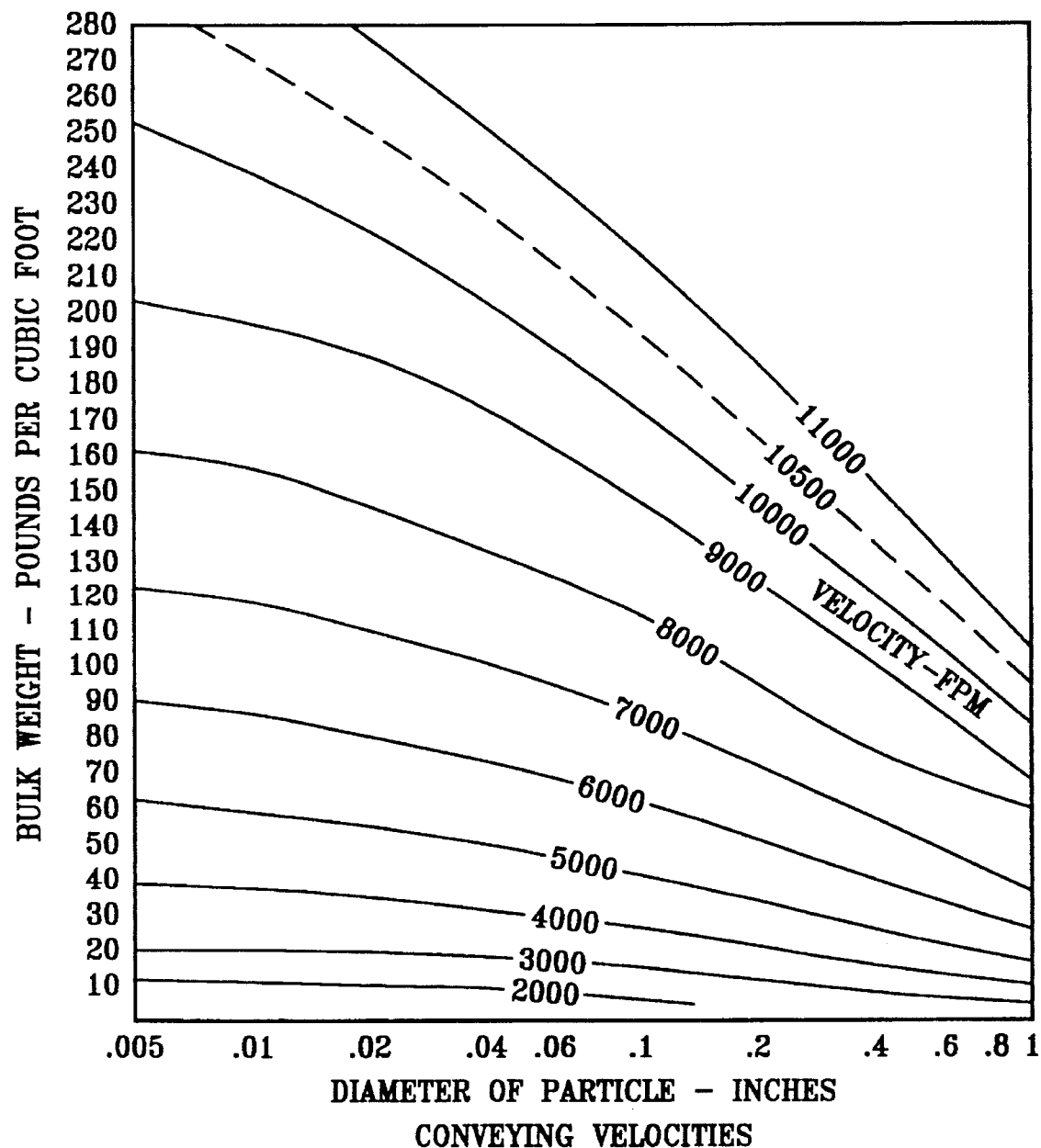
FIG. 4 is a graph showing the conveying velocities of materials as a function of material bulk weight and material particle size.

FIG. 3 illustrates generally at 40 a density controller of the present invention which utilizes analytical pneumatic dilute phase conveying principles to achieve improvements in uniform system air velocities by increasing the size of an air inlet opening and decreasing the size of media inlets in accordance with the teachings herein. The density controller 40 provides a means for effectively mixing high density abrasive material, such as steel grit, within a conveying airstream. The controller prevents clogging in the abrasive blasting system by ensuring that sufficient airflow and vacuum are maintained to propel the steel grit and by limiting the volume of grit that is conveyed by the blasting system.

The density controller 40 has a substantially cylindrical main body 42. The main body 42 includes a first open end 44, which telescopically receives the first intake nozzle end 20 of the vacuum hose 18, and a second substantially closed end 46. face 47 extends laterally across the end of the main body 42 to form the second substantially closed end 46. See FIG. 3. The substantially cylindrical main body has an inner surface 48. Formed on the inner surface 48 are a plurality of spacers 50 which separate the main body 42 from the first intake nozzle end 20 thereby forming a substantially annular-shaped air inlet 52 between an outer surface 54 of the first intake nozzle end 20 and the inner surface 48 of the main body 42. The air inlet 52 is defined by a predetermined area, which in a prototype of the present invention is 11.18 square inches.

Figure 5:
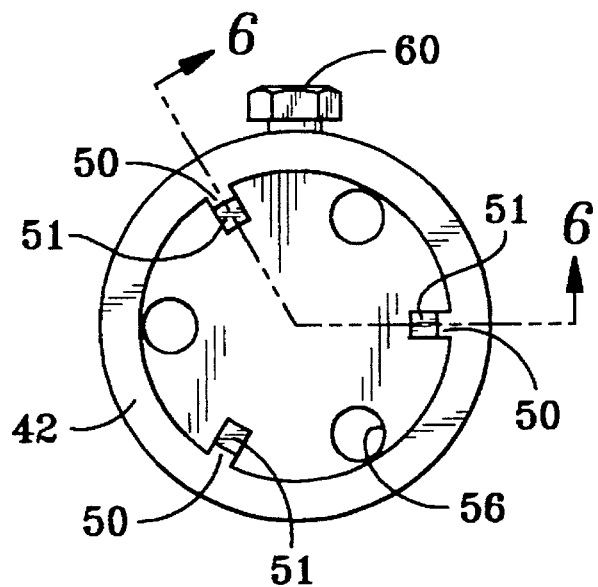
FIG. 5 is a side view of the open end of the density controller shown in FIG. 3.
Figure 6:
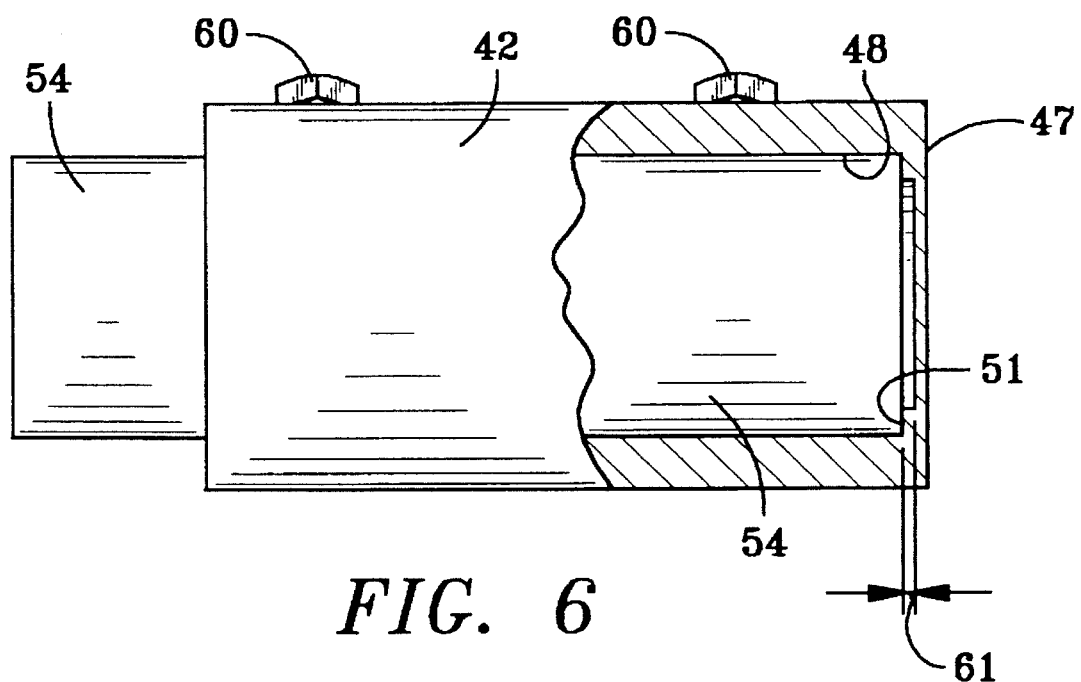
FIG. 6 is a sectional view of the density controller, taken along line 6—6 of FIG. 5.

Formed along the length of each spacer is a clearance member 51, shown in FIGS. 5 and 6. Each clearance member is located adjacent face 47 and extends radially inwardly toward the center of main body 42. The clearance members are adapted to support the end of nozzle 54 in the manner shown in FIG. 6 when the nozzle is located in the main body 42. The end of the nozzle is slid into the main body until the nozzle end contacts the clearance members. In this way, the nozzle end is separated from the controller closed end by a desired fixed distance indicated generally as 61 in FIG. 6.

The nozzle can not be moved closer to the controller closed end. If the nozzle is moved out of contact with the clearance members and away from the closed end increasing the separation distance, it will be readily apparent and the nozzle and controller can be easily repositioned to the required separation distance 61.

At least one clearance member must be provided. For purposes of disclosing the preferred embodiment, the controller includes three clearance members one at the end of each spacer adjacent closed end 46. Alternately, the clearance members may be made integral with the controller main body and do not have to be made integral with the spacers formed along the main body 42. Additionally, it is not required that the same number of spacers and clearance members be provided.

At least one media inlet 56, through which solid particles pass during operation of the density controller 40, is formed in the second substantially closed end 46 of the main body 42. The at least one media inlet 56 is formed in the laterally extending face 47, so that each of the at least media inlets extend in a generally longitudinal direction through the face, as shown in FIG. 3. The at least one inlet has a non-adjustable, non-variable total area ranging from 10% to 20% of the cross sectional area of the first intake nozzle end 20, as determined by an inner diameter 58. In the preferred embodiment, three inlets 56 are formed in the second substantially closed end 46. The three inlets 56 have a non-variable total area ranging from 10% to 20% of the cross sectional area of the first intake nozzle end 20. The three inlets are equally, circumferentially spaced apart on the substantially closed end 46. Also, the total area of the three inlets comprises from about 15% to 25% the area of the annular shaped air inlet 52. A means is provided for fixedly locating the substantially cylindrical main body 42 in a predetermined location about the first intake nozzle end 20, such as a pair of threaded fasteners 60, for example.

Significantly, during operation of the density controller of the present invention, any change in air flow velocity is minimized when the density controller 40 is moved from a position in midair to a position within a pile of solid particles, such as steel grit. Also, the change in air flow pressure is small, about 12%, when the density controller is inserted into such a volume of solid particles. Therefore, by minimizing air velocity and pressure fluctuations the density controller of the present permits sustained pneumatic conveyance of both high density and low density solid particles, while eliminating system choking.

In use, after the nozzle is slid into contact with clearance members 51 and the required separation distance 61 is provided, the closed end of the density controller is placed on the surface of the pile of steel grit 13 in the manner shown generally in FIG. 1. The vacuum generator is actuated and air is drawn through the annular inlets 52. The drawn air displaces the grit along the surface of the pile, flows between the discrete grit particles, and draws the grit off the pile surface through the media inlets 56 and accelerates the steel grit through the system with a conveying velocity between 10,000 and 11,000 ft./min.

The total area of the media inlets remains constant during operation of the density controller and the clearance members maintain a fixed separation distance between the nozzle and controller ends. By maintaining both a fixed total media inlet area and a fixed distance between the nozzle and controller ends, the drawn volume of grit remains constant and the required vacuum and air flow are provided thereby preventing system clogging.

The most efficient density controller includes clearance members which separate the nozzle and controller ends by approximately 0.662 inches. However it should be understood that the clearance members may be adapted to provide any suitable separation distance 61.

While this invention has been illustrated and described in accordance with a preferred embodiment, it is recognized that variations and changes may be made therein without departing from the invention as set forth in the following claims.

Having described the invention, what is claimed is:

1. In combination with a vacuum generator for vacuuming particles, the vacuum generator including a hose having an intake nozzle end having a cross-sectional area and an exhaust end, a density controller comprising:

a substantially cylindrical main body which includes a first open end, which telescopically receives the intake nozzle end, and a second substantially closed end, the substantially closed end having a laterally extending face, the body further including at least one clearance member adjacent the laterally extending face, said at least one member adapted to support the nozzle end to maintain a fixed separation distance between the nozzle end and the laterally extending face;

an air inlet formed between an outer surface of the intake nozzle end and an inner surface of the substantially cylindrical main body;

at least one opening formed completely in the laterally extending face of the second substantially closed end of the substantially cylindrical main body, the at least one opening having a total area ranging from 10% to 20% of the cross-sectional area of the intake nozzle end, the total area of the at least one opening being non-adjustable; and means for fixedly locating the substantially cylindrical main body in a predetermined location about the intake nozzle.

2. The combination, as claimed in claim 1, and wherein three openings are formed in the second substantially closed end, the three openings having a total area ranging from 10% to 20% of the cross-sectional area of the intake nozzle end.

3. The combination, as claimed in claim 1, and wherein the density controller has three openings and the three openings are spaced apart.

4. The combination, as claimed in claim 3, and wherein the three openings are equally, circumferentially spaced apart.

5. The combination, as claimed in claim 1, and wherein the air inlet is annular-shaped.

6. The combination, as claimed in claim 5, further comprising spacing means for maintaining a constant dimension of the annular-shaped air inlet.

7. The combination as claimed in claim 6 wherein the spacing means is comprised of three longitudinally extending members which are equally, circumferentially spaced apart about the density controller body.

8. The combination as claimed in claim 7 wherein there are three clearance members, and each clearance member is made integral with a respective member of said spacing means at an end of the spacing means adjacent the laterally extending face.

9. The combination, as claimed in claim 1, and wherein the at least one opening and the air inlet each have a total area and the total area of the at least one opening comprises from about 15% to 25% of the area of the air inlet.

10. In a pneumatic conveyor for high density abrasive material, the pneumatic conveyor including a hopper for storing the collected high density abrasive material, a vacuum generator, and a vacuum hose communicating with both the vacuum generator and the hopper, the vacuum hose having a first intake nozzle end having an inner diametral dimension and a cross-sectional area, and a second exhaust end, whereby the high density abrasive material is conveyed by action of the vacuum generator with a conveying velocity of at least 9000 feet per minute through the first intake nozzle end, through the vacuum hose, through the second exhaust end, and is deposited in the hopper, the improvement comprising:

density control means for mixing the high density abrasive material within a conveying airstream, the density control means having a substantially cylindrical main body which includes a first open end, which telescopically receives the first intake nozzle end of the vacuum hose, and a second substantially closed end having a laterally extending face;

an annular-shaped air inlet formed between an outer surface of the first intake nozzle end and an inner surface of the substantially cylindrical main body, the air inlet having an area;

spacing means for maintaining a constant dimension of the annular-shaped air inlet;

at least one clearance member along the spacing means, the clearance member being for maintaining a fixed distance between the laterally extending face and the nozzle end;

at least one media inlet formed completely in the laterally extending face of the second substantially closed end of the substantially cylindrical main body, the at least one media inlet having a total area ranging from 10% to 20% of the cross-sectional area of the first intake nozzle end and from about 15% to 25% of the area of the annular-shaped air inlet, wherein the total area of the at least one media inlet is non-variable; and means for fixedly locating the density control means in a predetermined location about the first intake nozzle end.

11. A pneumatic conveyor for high density abrasive material, as claimed in claim 10, and wherein three media inlets are formed in the second substantially closed end, the three media inlets having a total area ranging from 10% to 20% of the cross-sectional area of the first intake nozzle end.

12. A pneumatic conveyor for high density abrasive material, as claimed in claim 11, and wherein the three media inlets are spaced apart.

13. A pneumatic conveyor for high density abrasive material, as claimed in claim 12, and wherein the three media inlets are equally, circumferentially spaced apart.

14. A vacuum generation system for vacuuming high density abrasive blast media, the vacuum generation system comprising:

a vacuum generator;

a vacuum hose communicating with the vacuum generator, the vacuum hose having a first intake nozzle end having an inner diametral dimension and a cross-sectional area, and a second exhaust end, whereby the high density abrasive material is conveyed by action of the vacuum generator with a conveying velocity greater than 9000 feet per minute through the first intake nozzle end, through the vacuum hose, and through the second exhaust end;

a density controller for mixing the high density abrasive material within a conveying airstream, the density controller having a substantially cylindrical main body which includes an interior, a first open end, which telescopically receives the first intake nozzle end of the vacuum hose, and a second substantially closed end, having a laterally extending face;

three openings which are equally, circumferentially spaced apart about the laterally extending face of the second substantially closed end of the density controller, the three openings located completely along the laterally extending face and having a total area ranging from 10% to 20% of the cross-sectional area of the first intake nozzle end, and wherein the total area of the three openings is non-variable;

an annular-shaped air inlet formed between an outer surface of the first intake nozzle end and an inner surface of the density controller, the air inlet having an area, and wherein the annular-shaped air inlet is dimensioned such that the total area of the three openings comprises from about 15% to 25% of the area of the annular-shaped air inlet;

spacing means for maintaining a constant dimension of the annular-shaped air inlet;

at least one clearance member made integral with said spacing means, said at least one clearance member extending toward the interior of the main body, said at least one clearance member being adapted to maintain the intake nozzle end a fixed distance from the laterally extending face; and means for fixedly locating the density controller in a predetermined location about the first intake nozzle end.

15. A vacuum generation system as claimed in claim 14 wherein the spacing means is comprised of three members which are equally, circumferentially spaced apart about the density controller body.

16. A vacuum generation system as claimed in claim 15 wherein there are three clearance members, and each clearance member is made integral with a respective member of said spacing means at an end of the spacing means adjacent the laterally extending face.

* * * * *